United States Patent [19]
Voth et al.

[11] 3,909,947
[45] Oct. 7, 1975

[54] METHOD AND APPARATUS FOR ENLARGING PATTERNS

[75] Inventors: Volkmar H. Voth, Seulberg, Taunus; Heimo Plumpe, Darmstadt, both of Germany

[73] Assignee: Texography-Vertrieb Volkmar H. Voth KG, Seulberg, Germany

[22] Filed: Apr. 20, 1973

[21] Appl. No.: 353,197

[30] Foreign Application Priority Data
Apr. 19, 1972 Germany............................ 2219076

[52] U.S. Cl. .................. 33/23 G; 33/17 R; 33/1 M
[51] Int. Cl.² ......................................... B43L 13/10
[58] Field of Search......... 33/17, 23 G, 23 C, 1 XY, 33/18 R

[56] References Cited
UNITED STATES PATENTS

| | | | |
|---|---|---|---|
| 878,046 | 2/1908 | Cote ................................. | 33/23 G |
| 2,280,163 | 4/1942 | Ryan.................................. | 33/23 G |
| 3,024,396 | 3/1962 | Peckjian............................. | 33/1 M |
| 3,032,881 | 5/1962 | Fengler............................. | 33/23 C |
| 3,182,399 | 5/1965 | Price.................................. | 33/23 C |

*Primary Examiner*—Harry N. Haroian
*Attorney, Agent, or Firm*—Bierman & Bierman

[57] ABSTRACT

Method and apparatus for varying the size of patterns is provided in which one or more points on a basic pattern is measured with respect to a selected coordinate system. One or more incremental values are assigned to each such point which incremental value is proportional to the distance between said point and its corresponding point on another size pattern in relation to the coordinate system. The basic pattern is then traced and the incremental value continuously and automatically calculated and stored or applied to another tracing system for generating a different size pattern in proportion to said incremental values.

10 Claims, 4 Drawing Figures

METHOD AND APPARATUS FOR ENLARGING PATTERNS

Patterns, e.g. those for the garment industry used in the manufacture of ready-to-wear clothes, are usually drawn by the designer in one basic size. This specimen pattern must then be enlarged or reduced in size for the other ready-to-wear sizes. This is not a proportionate, true-to-scale enlargement or reduction, but rather a dimensionally distorted reproduction, in which individual parts of the pattern are enlarged, reduced, shifted and/or turned to a variable extent. This not-to-scale varying of sizes is also called 'graduating'. In the conventional manner, this graduating' is done by hand, proceeding in the following manner: Along the contour of the model to be graduated so-called principal points are marked, which may, but do not have to, coincide with particularly salient points, such as corners or notches or similar, and whose position and closeness are selected on the basis of experience. Each of these principal points is assigned tables of so-called skip-values or incremental values obtained from experience (and which are written down, e.g., directly on the model), indicating by how many millimeters the principal point concerned must be shifted in an $x$-direction and in a $y$-direction, when passing from the basic (initial) size to the next-larger or next-smaller size. The passing to additional sizes is done by the appropriate multiplication of the incremental values. During the actual graduating, a transparent paper may be placed on the model, the shifts of the principal points are plotted and subsequently the contour-lines connecting the new principal points are drawn in freely by hand and 'measured by eye'. Although well-trained and experienced skilled persons attain astonishing mastery and accuracy in this manual process, it nonetheless has fundamental disadvantages. Manual measuring and plotting of the shifts for each principal point and the drawing in of the connecting lines is time consuming even in the presence of great dexterity; if the connecting line between two principal points is not a straight line, its course — as drawn by eye — is basically more or less inexact; finally, the process assumes the availability of suitably skilled, experienced and highly-paid specialists. Meeting this latter condition is becoming ever more difficult, especially for the smaller enterprises of the garment industry.

For this reason, there has been no lack in attempts at automating the graduating of patterns. The proposals usable in practice which have become known thus far aim at programming a computer in such a manner that it will automatically calculate the variations of the graduated size from the basic size not only for the principal points, but also continually for the intermediary contour-lines, and will correspondingly control a drawing pencil or cutting stylus. To implement this computing and control operation, there must be stored in the computer the outline of the model, the positions of the principal points, the incremental values assigned to each principal point, and furterermore complete computing programs for each segment between two principal points. If one considers further that for each finished garment a large number of pattern-parts are required, which have all to be graduated, and that the graduating of each garment must be effected as a rule for about 10 to 20 ready-to-wear sizes, it becomes apparent that fully automatic graduating can be carried through only by extraordinarily large and expensive electronic computers. Such large-size facilities can be afforded only by very large enterprises and even then difficulties will be encountered when a larger number of different garments has to be graduated simultaneously for a number of different sizes.

It is therefore the task of this invention to create an automatic graduating process by which the aforementioned disadvantages of the manual method depending 'on the measure of the eye' will be eliminated, yet which will not require the computing and storage capacity of an electronic computer.

The process for varying the sizes of patterns according to the invention starts with a model in the basic size, on which principal points are marked an incremental values are assigned to each principal point, which values or their multiples, respectively, indicate the shifts of the principal point in an $x$-direction and a $y$-direction required for passing from the basic to the final size.

To solve this task, the invention provides for a process, in which the model-pattern's contours are traced by a scanner and obtaining in this manner control signals for the automatic control of a follow-on pencil (or stylus) drawing or cutting the pattern varied in size. The characteristic particularity of the process consists in that along each distance between two principal points of the specimen pattern the continually varying control signals for the variations of the position of the follow-on pencil from that of the scanner are obtained by forming a distance signal, which is a function of the distance of the scanner from the last passed principal point and/or from the next-following one. This distance signal serves as standard as to which fraction of the incremental values $U$, $V$ assigned to the principal points must be added at the point between the principal points reached at that moment.

According to the process pursuant to the invention, the operator only has to trace out the specimen pattern with the scanner and upon passing each of the principal points to key in in a memory, by way of a keyboard, the incremental values assigned to said principal point. The follow-on pencil will then be controlled automatically. The operation is thus extremely simple and in particular, there is eliminated the conventional, inaccurate retracing of the lines between the principal points, using 'eye measure'. The computing device required for the process according to the invention only needs to store the supplementary values of the two principal points, which define the distance under consideration, and to form a ratio between these incremental values and the constantly varying distance signal. Therefore, the computer can be a very simple and inexpensive one, and would not require any large random access memories.

The aforementioned distance signal may consist, for example, simply of the $x$-scanning signal or the $y$-scanning signal, especially if the segmental section runs approximately parallel to the $x$-axis or to the $y$-axis. It may be decided separately for each distance between two principal points, whether the $x$ or the $y$-signal should be used as distance signal.

The generation of the $x$ and $y$-scanning signals as well as the generation of the distance signal is preferably done digitally and the follow-on pencil is also controlled by digital position control signals. The entire computing device may then consist of simple and inexpensive shifting registers and counters.

The principle of the process according to the invention is explained in the following with the aid of the drawings and specific embodiments are described.

Figure 1:
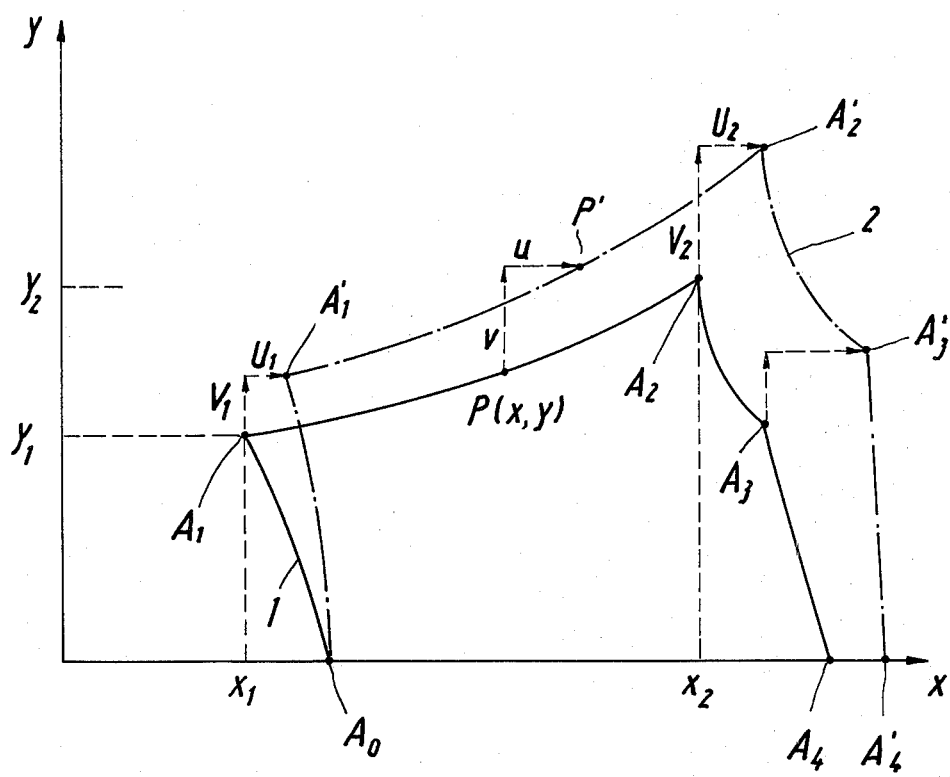
FIG. 1 shows schematically the specimen pattern in the basic (initial) size, the graduated pattern in the final size and elements and designations occurring during graduating and used in the description.

In FIG. 1, a specimen pattern is shown by the solid contour line 1, from which there is to be obtained, through graduating, the pattern in another ready-to-wear size, drawn in a dotted line. On the pattern 1 there is indicated the position of so-called principal points $A_0$, $A_1$, $A_2$, $A_3$ and $A_4$. These principal points coincide with the corners of the contour-line forming the specimen pattern. However, it is of course possible to provide also, at other locations of the pattern, additional principal points in any desired density and arrangement, as needed. Each principal point (e.g., $A_1$), is assigned a pair of skip-values or incremental values (e.g., $U_1$, $V_1$). These incremental values indicate by which distance (e.g., in mm), the respective principal point has to be shifted in an x-direction, in order to arrive at the next-larger or next-smaller garment-size. The x or y-direction is advantageously selected so that it will coincide with a straightline part of the contour-line (e.g. between principal points $A_0$ and $A_4$), but it is possible, of course, to specify the x or y-direction on the model in any other desired manner. When graduating by hand, one would draw in, starting with each principal point (e.g. $A_1$), the respective shifts (e.g. $U_1$, $V_1$) and thereby arrive at the correspondingly shifted principal point (e.g., $A_1'$), and subsequently connect these shifted principal points by lines drawn by hand as measured 'by eye'. The assignment of incremental values to the principal points is done either by entering this directly on the model or on a special table supplied with the model.

However, the procedure is different according to the process pursuant to the invention. The model is traced with a scanner, e.g. a tracing point or a magnifying glass with cross-hair lines, moving continually along the contour-line. This will generate electric signals, which are proportionate to the relative position P of the scanner at the moment, in the x and y-direction. With these signals a follow-on point is controlled, which traces the pattern, for example on paper, or cuts it out of sheeting, in a different size. So that the follow-on point does not trace the original pattern 1, but the changed pattern 2, there must be fed at each moment the deviations $u$, $v$ between the instantaneous coordinates $x$, $y$ of the scanner P and the instantaneous position P' of the follow-on point. These deviations $u$, $v$ must of course have at each principal point (e.g. $A_1$) the same values as the incremental values $U_1$, $V_1$ asigned to this principal point. For any desired point between two principal points (e.g. $A_1$, $A_2$), the deviations $u$, $v$ are determined as follows: It is assumed that between two principal points the deviations $u$, $v$ will vary proportionately and to the same extent as the distance of the scanner point P from a principal point $A_1$ increases or, respectively, decreases from another principal point $A_2$. For this, there can only be used as "distance" either the distance in the x-direction or in the y-direction, or a distance measurement suitably formed of the two coordinates $x$ and $y$ (e.g., the function $\sqrt{x^2 + y^2}$). In practice, it will be sufficient to use as distance parameters only the x or y coordinate, whereby this process will be the more accurate, the closer the segment under consideration will run in parallel to the x-axis or to the y-axis, respectively. Thus, in FIG. 1, one will select as distance parameters the x-coordinate for the segment $A_1 - A_2$, and the y-coordinate for the segment $A_0 - A_1$, $A_2 - A_3$ and $A_3 - A_4$.

If the tracing point P with the coordinates $x$, $y$ passes the segment between principal point $A_1$, with x-xoordinate $X_1$ and incremental values $U_1$, $V_1$, and principal point $A_2$ with x-coordinate $X_2$ and incremental values $U_2$, $V_2$, then the x-coordinate and the instantaneous incremental values $u$, $v$, have to pass the interval $DX = X_2 - X_1$, $DU = U_2 - U_1$, and $DV = V_2 - V_1$. The assumption is that at each point P between the principal points $A_1$ and $A_2$, the increment in the additional value u over the starting value $U_1$, i.e. $u - U_1$, will be in a constant ratio to the increment which occurred in the x-coordinate, i.e. $x - X_1$, and which ratio shall be equal to the ratio between the total of the intervals passed through, i.e. between DU and DX. Thus:

$$\frac{u - U_1}{x - X_1} = \frac{U_2 - U_1}{X_2 - X_1} = \frac{DU}{DX} \qquad (1)$$

Accordingly, for the increment in the y-direction:

$$\frac{v - V_1}{x - X_1} = \frac{V_2 - V_1}{X_2 - X_1} = \frac{DV}{DX} \qquad (2)$$

If for the segment concerned the y-coordinate would have been chosen as segment paramater, and not the x-coordinate, the respective equations would be:

$$\frac{u - U_1}{y - Y_1} = \frac{U_2 - U_1}{Y_2 - Y_1} = \frac{DU}{DY} \qquad (3)$$

$$\frac{v - V_1}{y - Y_1} = \frac{V_2 - V_1}{Y_2 - Y_1} = \frac{DV}{DY} \qquad (4)$$

It can be seen from the equation (1) that to generate a control signal which will be proportionate to the respective increment of the incremental value $u$, i.e. $u - U_1$, it is sufficient to generate a signal which is proportionate to the x-coordinate relative to the last passed principal point, i.e. $x - X_1$, and to multiply this signal by the constant value DU/DX. The signal proportionate to the instantaneous quantity $x - X_1$ can be generated digitally by way of an incremental distance measuring transmitter or analogously, e.g. by way of a slide-wire resistor, whereby these devices are set to zero each time they pass a principal point (e.g., $A_1$), so that the generated signal will be proportionate only to the difference $x - X_1$.

The quantity DU (or DV) is the difference between the increments U, V of the two principal points considered, $A_1$ and $A_2$; thus, it is necessary only to input into the computer these values upon passing each principal point. The quantity DX is the total "distance" between the two principal points. It can be determined, e.g. in that prior to the actual graduating the contour of the model is traced with the scanner, measuring continually the $x$ and $y$-coordinates and assigning to the principal points $A_1$, $A_2$, etc. the values $X_1$, $Y_2$ etc. obtained at these principal points, in the same manner as done for the increments $U_1$, $V_1$, e.g. by recording on the model or in a table.

This prior tracing of the contour of the model can be eliminated, if during the actual graduating the created $x$ and $y$-scanner signals are stored, e.g. in a slide register, and only upon reaching principal point $A_2$, i.e. when the $x$-scanning signal is equal to the value $X_2$, are all the stored values multiplied by the now available value $DU/DX$.

The process, described in principle in the preceding, can be refined further, if accuracy is to be increased further. Thus, the coordinate differences $DX$ and $DY$ occurring in equations (1) to (4) can be corrected with the incremental values $U_1$, $U_2$ and $V_1$, $V_2$, respectively, of the two principal points $A_1$ and $A_2$ defining the the segment under consideration, i.e. the difference of co-ordinates $DX$ and $DY$, respectively, can be related to the shifted principal points $A_1'$ and $A_2'$.

Figure 2:
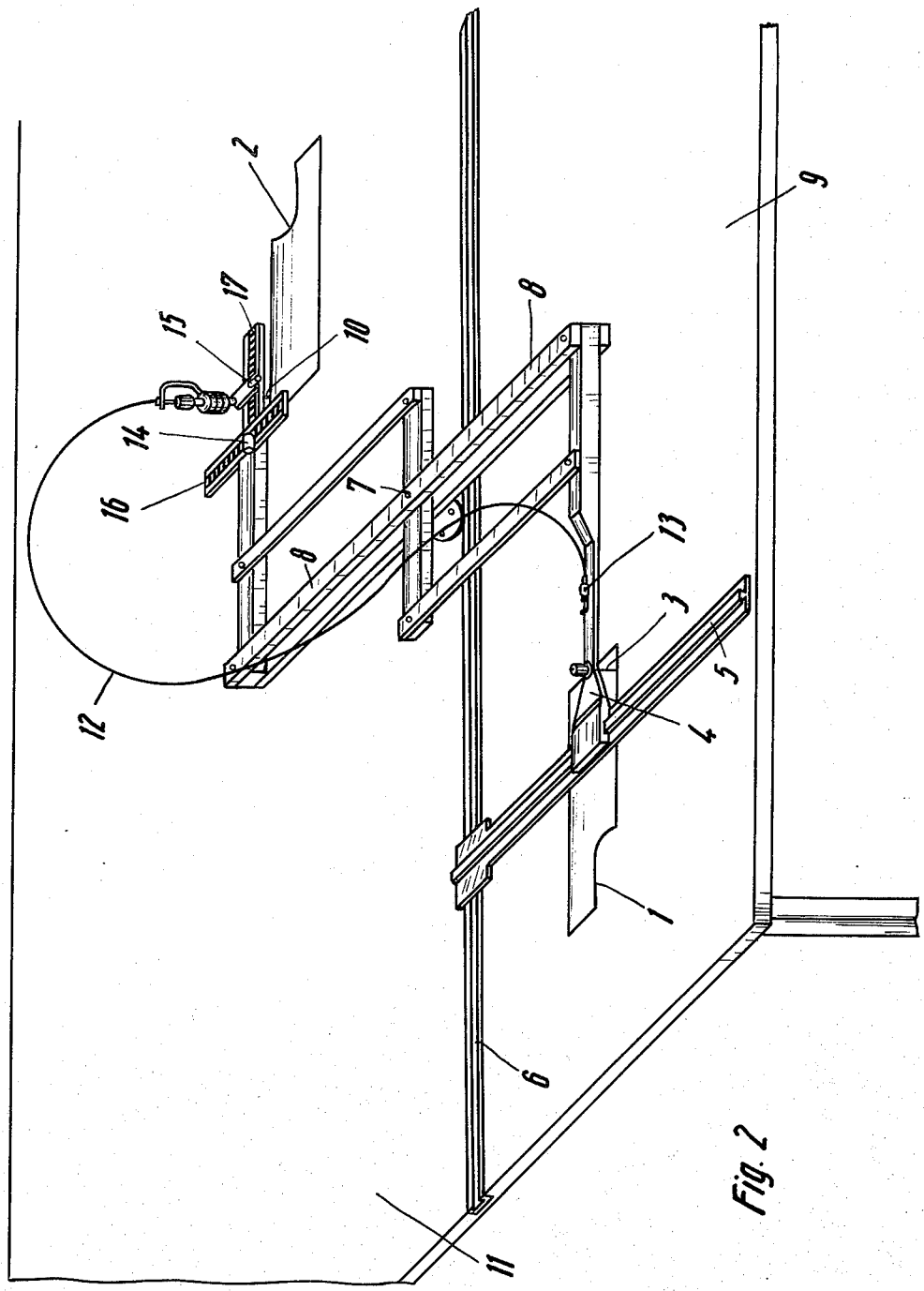
FIG. 2 shows a perspective view in greatly simplified form of a device for carrying through the process.

FIG. 2 shows a simple device for implementing the process according to the invention. On a worktable 9, which carries the model 1, there is arranged a sliding tracing point 3, whose carrier 4 is guided along a rectilinear guide rail 5 ($y$-direction), which in turn is guided along a guide-rail 6, perpendicular to it ($x$-direction). The tracing point may also be replaced by a magnifying glass and the manual movement along the contours of the model 1 can be replaced by an optical-electronic scanner and follow-on device. The movements of tracing point 3 are transferred in correct scale to a follow on point 10, by way of a linkage 8 pivoted on a fixed point 7. The follow-on point 10, movably arranged on a worktable 11 draws there the pattern 2, the size of which has been varied, or cuts it out, e.g. of sheeting. The worktables 9 and 11 may also form a single unit. The follow-on point 10 may be raised by means of a Bowden control 12 with control lever 13, so that it will not draw or cut. By means of servomotors 14, 15, acting along toothed racks 16, 17 arranged perpendicularly to each other, the follow-on point can be supplied with additional movements in relation to the linkage 8. These servomotors are controlled by control signals, e.g. control voltages or digital intermittent impulses, generated in the volume as described above with the aid of FIG. 1. Measuring devices are required to generate the control signals. They generate signals which are proportionate to the displacements of tracing point 3 in the $x$ and $y$ direction. For example, measuring rollers can be arranged on the parallelogram linkage 8, running on worktable 9 and driving measuring signal transmitters. These devices for generating control signals are not shown in FIG. 2.

Figure 3:
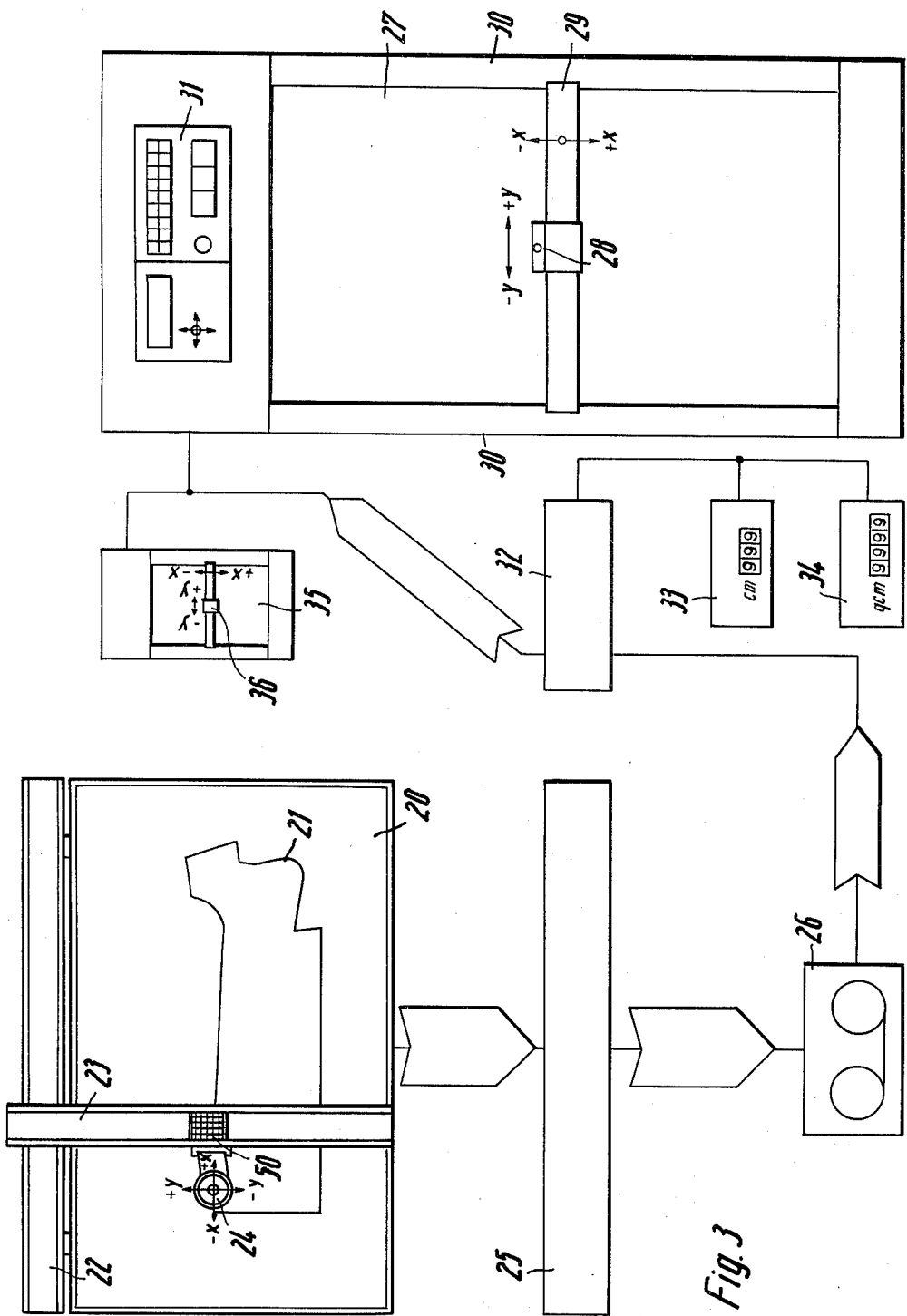
FIG. 3 shows the diagram of completely digitally operating device to carry through the process.

In the specific embodiment according to FIG. 3, the model to be graduated 21 is arranged on the input table 20. Along a guiderail 22 a second guide rail 23 is arranged sliding in the $x$-direction along which a scanner 24 is movable in the $y$-direction. This scanner, movable in the $x$ and $y$ directions, has a tracing point, a magnifying glass with cross-hairs or similar, by which the operator can trace the contours of model 21. According to the shifts of scanner 24 in the $x$ and $y$ direction, digital position such as a wire potentiometer, emitters (not shown) generate scanning signals, which are input to a computer 25. In addition, a keyboard 50 is assigned to the scanner 24. With these keys, any desired numerical values, corresponding to the incremental values $U$, $V$ at the principal points, may be input in the computer 25. From the scanning signals for the $x$ and $y$-direction the computer generates the segment signal, and from the latter and the input $U$ and $V$-values it generates the control signals for the deviations of the varied-size pattern from the model. These increment control signals and the $x$ and $y$ scanner signals are stored in a tape-recorder 26.

On the right-hand side of FIG. 3 a reproduction table is shown, on which a follow-up point 28 is arranged along a guide rail 29 movable in the $y$-direction, which rail is movable in turn along guide rails 30, in the $x$-direction. The follow-on point 28 may be a drawing pencil, for example, with which the varied-size pattern can be drawn on paper, or it may also be an electrically heated stylus, for example, with which the pattern may be cut out of thermoplastic sheeting. The movements of the follow-on point 28 in the $x$ and $y$ direction are driven by conventional electric servomotors (not shown).

Signals stored in the tape-recorder 26 serve to control thhe servomotors. These signals consist of the $x$ and $y$ scanner-signals and of the incremental control signals. The recalling of the signals from the tape 26 can be controlled by a keyboard 31 arranged on reproduction table 27.

If the pattern is to be drawn on reproduction table 27 consecutively in varying ready-to-wear garment sizes, it is not necessary to store on tape 26 different increment control signals for the different sizes. It will be sufficient to comput the increment control signals for the largest occurring size and to store these on tape 26. If a smaller size is to be drawn on reproduction table 27, it will suffice to multiply the increment control signals by a corresponding proportionality factor that is smaller than 1. This is done in the multiplication stage 32. The selection of this proportionality factor and thus of the size, can also be controlled by means of keyboard 31.

From the multiplication stage 32, the control impulses may additionally be fed to integrating counters 33, 34, which record the total circumference and the total area of the respective varied-size pattern.

The digital control impulses may also be fed to additional reproduction tables arranged in parallel to reproduction table 27, e.g. reproduction table 35, which is also provided with a follow-on point 36 movable in the $x$ and $y$ direction by means of servomotors. In the example shown, the reproduction table 35 draws the varied-size pattern in a scale reduced by the factor of 1:5. Such reduced-scale model patterns are required for planning purposes. The reproduction table 35 can also be arranged, of course, to draw on the same scale as the reproduction table 27.

Figure 4:
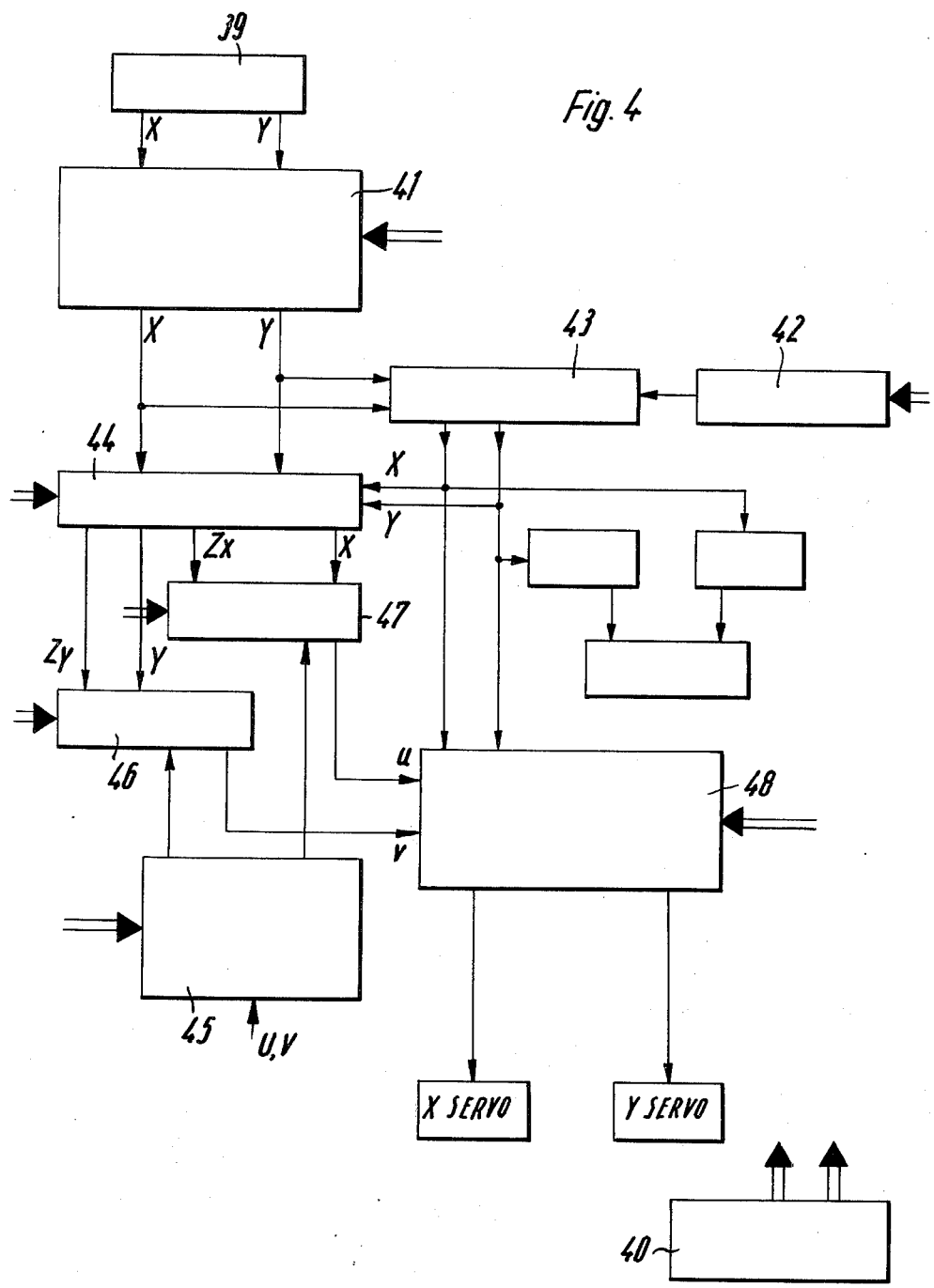
FIG. 4 shows the block diagram of the computing device according to FIG. 3.

In the block diagram according to FIG. 4, the individual blocks have the following meaning: 40 is an impulse control, which controls the entire computing process. This control unit is connected to the individual blocks wherever the double arrow is shown. 41 is the input table with the devices for generating $x$ and $y$ scanning signals. 42 is a logic stage for temporary storage of $x$ and $y$ impulses, to read the direction of movement of the scanner (e.g. to $+x$ or to $-x$), as well as for generating special marking signals, if specific points along the contour-lines of the pattern are to be especially marked, e.g. for wedge-like folds, or similar. The x and y-signals are stored in a sliding register 43 controlled by an impulse emitter 42, and are additionally fed to a computing stage 44 to form and/or select the segment (distance) signal. The increments U and V of the principal points are fed to a computing and storage stage 45. In the graduating logic stages 46, 47 the increment control signals are formed out of the segment signal and the increments U, V, separate for x and y coordinates. The increment control signals and the x and y-scanning signals are stored in the storage tape 47. From there, they are called to the x-servomotor and y-servomotor of the follow-on point. Each of the above described individual elements are conventional.

The above described type models are not to be understood as limiting examples, and numerous changes and arrangements are possible within the framework of the invention, as it is defined in the herein following claims.

What is claimed is:

1. A process for varying the sizes of patterns, starting with a model in a basic size, on which a plurality of principal points are marked and a plurality of incremental values along a selected coordinate system and are assigned to each principal point, and wherein each incremental value assigned to a principal point indicates the distance of the shift by which the said principal point must be shifted in a selected direction during the transfer from the basic to the final size, comprising the steps of
   a. tracing the model with a scanner,
   b. generating signals which are proportionate to the instantaneous position of the scanner with respect to each axis of the selected coordinate system,
   c. generating at least one distance signal, said distance signal being a function of the instantaneous distance of the scanner from the last passed principal point along at least one coordinate axis,
   d. generating control signals which are proportionate to the instantaneous value of the said distance signal and proportionate to the difference of the incremental values along each axis of the said coordinate systems between two adjacent principal points,
   e. controlling a follow-on point means which draws or cuts the varied size pattern,
   f. the step of controlling the follow-on point means comprising controlling the follow-on point means along a duplicating path which corresponds to a movement proportionate with the scanner and simultaneously controlling instantaneous deviations of the follow-on point means from the duplication path by and proportional to the said control signals.

2. The process according to claim 1, in which the incremental values assigned to each principal point are placed in a computer as the scanner passes said principal point.

3. A process according to claim 1, wherein said coordinate axes are x,y axes and the distance signals are superimposed on the x and y-scanning signals, respectively, to form x and y position control signals, and that the follow-on point is controlled exclusively by the position control signals.

4. A process according to claim 1, further comprising the step of storing the increment control signals and/or the position control signals.

5. Apparatus for grading patterns in which a pattern model in a basic size has a plurality of principal points assigned thereto, and a plurality of selected incremental values along a selected coordinate system are assigned to each principal point, each incremental value assigned to a principal point indicates the distance by which the said principal point must be shifted in a selected direction during the transfer from the basic to the final size comprising:
   a. a scanner and an input table, said scanner being movable over an input table in two coordinate directions, x and y,
   b. means for generating x and y-scanning signals proportionate to the instantaneous relative shift of the scanner,
   c. means for generating a distance signal proportionate to the instantaneous distance of the scanner from the last passed and/or the next-following principal point,
   d. a keyboard for manual input of the said incremental values assigned to a principal point,
   e. means for generating increment control signals for the x and y-direction which are proportionate to the instantaneous distance signal and to the difference between the incremental values of adjacent principal points,
   f. a follow-on point movable over a reproduction table in x and y-direction, with means for drawing and/or cutting out the varied-size pattern from a material placed on the reproduction table, and
   g. means for moving the follow-on point in the x and y-direction proportionate to and in response to the increment control signals.

6. A device according to claim 5, further comprising a carrier for the follow-on point, said carrier being connected to the scanner by a mechanical linkage for simultaneous proportionate movements of the scanner and follow-on point, 7. A device according to claim 5, wherein said scanner is borne by a carrier movable in x and y-direction over the input table, said keyboard being mounted on the carrier.

8. A device according to claim 5, wherein the devices to generate the x and y-scanning signals are digital position emitters, that digitally operating computers, sliding registers and memories are provided to generate the distance signal and the increment control signals, and that the setting mechanisms for the follow-on point consist of digital servomotors.

9. A device according to claim 8 further comprising a keyboard on said reproduction table, said keyboard being connected to said computer, by means of which control orders are conveyed to the computer to recall the stored signals from which are generated the increment control signals.

10. A device according to claim 5, wherein the input table is controllably connected to several reproduction tables with independently controllable follow-up points.

* * * * *